US009920640B2

(12) United States Patent
Hoeger

(10) Patent No.: US 9,920,640 B2
(45) Date of Patent: Mar. 20, 2018

(54) EXTRUDED PROFILE FOR MANUFACTURING A BLADE OF AN OUTLET GUIDE VANE

(71) Applicant: MTU Aero Engines AG, Munich (DE)

(72) Inventor: Martin Hoeger, Erding (DE)

(73) Assignee: MTU Aero Engines AG, Munich (DE)

( * ) Notice: Subject to any disclaimer, the term of this patent is extended or adjusted under 35 U.S.C. 154(b) by 228 days.

(21) Appl. No.: 14/595,094

(22) Filed: Jan. 12, 2015

(65) Prior Publication Data
US 2016/0201486 A1    Jul. 14, 2016

(30) Foreign Application Priority Data

Jan. 16, 2014   (DE) .................. 10 2014 200 644

(51) Int. Cl.
| | |
|---|---|
| F01D 9/04 | (2006.01) |
| B21C 23/16 | (2006.01) |
| F01D 5/14 | (2006.01) |

(52) U.S. Cl.
CPC ............. F01D 9/041 (2013.01); B21C 23/16 (2013.01); F01D 5/141 (2013.01); F05D 2230/24 (2013.01); F05D 2230/61 (2013.01); F05D 2240/12 (2013.01); F05D 2250/70 (2013.01); F05D 2250/713 (2013.01);
(Continued)

(58) Field of Classification Search
CPC .... F01D 5/141; B21C 23/16; F05D 2240/301
See application file for complete search history.

(56) References Cited

U.S. PATENT DOCUMENTS 3,333,817 A * 8/1967 Rhomberg .............. B64C 11/18
  415/181
3,565,548 A   2/1971 Fowler
(Continued)

FOREIGN PATENT DOCUMENTS

| DE | 10 52 781 | 3/1959 |
|---|---|---|
| DE | 10 2006 055 869 | 5/2008 |

(Continued)

OTHER PUBLICATIONS

English translation of WO 9821375.*

*Primary Examiner* — Ninh H Nguyen
*Assistant Examiner* — Topaz L Elliott
(74) *Attorney, Agent, or Firm* — Davidson, Davidson & Kappel, LLC

(57) ABSTRACT

An extruded profile for manufacturing a blade of an outlet guide vane of a turbine engine. A cross-sectional area has an axial length LAX and a thickness D/LAX relative to the axial length LAX. A cross-sectional area has an at least nearly axisymmetric leading edge region, a first transition region having a varying relative thickness D/LAX. A first constant region has a relative thickness D/LAX at least substantially constant and, relative to a leading edge of the extruded profile, begins at the closest at 10% LAX and ends at the furthest at 50% LAX. A second transition region has a varying relative thickness D/LAX and, relative to the leading edge of the extruded profile, begins at the closest at 30% LAX and ends at the furthest at 90% LAX. A second constant region has a relative thickness D/LAX at least substantially constant and an axial length X of 40% LAX at most; and an at least nearly axisymmetric trailing edge region.

23 Claims, 2 Drawing Sheets

(52) U.S. Cl.
CPC ...... *F05D 2250/72* (2013.01); *F05D 2250/73* (2013.01); *F05D 2250/75* (2013.01); *Y02T 50/673* (2013.01)

(56) References Cited

U.S. PATENT DOCUMENTS

| | | | | |
|---|---|---|---|---|
| 6,260,794 | B1* | 7/2001 | Rowe | B64D 33/04 244/12.5 |
| 6,905,307 | B2* | 6/2005 | Kawarada | F01D 5/141 29/557 |
| 8,393,872 | B2* | 3/2013 | Kirtley | F01D 5/141 416/242 |
| 8,596,955 | B2* | 12/2013 | Freeman | F01D 1/02 415/3.1 |
| 9,091,174 | B2* | 7/2015 | Bagnall | F01D 5/141 |
| 2007/0292274 | A1 | 12/2007 | Burdgick et al. | |
| 2009/0226322 | A1 | 9/2009 | Clemen | |
| 2010/0006276 | A1* | 1/2010 | Cremaschi | B21D 53/085 165/175 |
| 2011/0255964 | A1 | 10/2011 | Clemen | |
| 2012/0014780 | A1 | 1/2012 | Clemen | |

FOREIGN PATENT DOCUMENTS

| | | | |
|---|---|---|---|
| DE | 10 2010 014900 | 10/2011 | |
| DE | 10 2010 027 588 | 1/2012 | |
| EP | 0816637 | 1/1998 | |
| WO | WO 9821375 A1 * | 5/1998 | ............. C22C 14/00 |

\* cited by examiner

EXTRUDED PROFILE FOR MANUFACTURING A BLADE OF AN OUTLET GUIDE VANE

This claims the benefit of German Patent Application DE 10 2014 200644.9, filed Jan. 16, 2014 and hereby incorporated by reference herein.

The present invention relates to an extruded profile for manufacturing a blade of an outlet guide vane of a turbine engine. The present invention also relates to a method for manufacturing a blade of an outlet guide vane of a turbine engine using such an extruded profile, a blade manufactured from such an extruded profile, as well as to an outlet guide vane and a turbine engine having a blade of this type.

BACKGROUND

In turbine engines, a stationary outlet guide vane (generally referred to as a TEC or turbine exhaust casing) is installed to increase pressure by removing voracity from the outflow, thereby improving propulsive efficiency. More recent engine architectures attach considerable importance to the use of the thinnest possible outlet guide vanes that have blades having comparatively short chord lengths. In particular, when the outlet guide vane is configured as what is generally referred to as a MiniTec, comparatively high blade numbers are required, thereby necessitating very narrow designs including short chord lengths and thin profiles for the individual blades. The blades are typically manufactured from two curved sheet-metal halves that are welded together.

The optimal profile shape of such blades can only be realized, however, by using further post-machining steps that entail considerable expenditure of time and cost. These post-machining steps, which are required to form precise profile shapes, are, therefore, partly eliminated. However, this leads to flow losses and corresponding efficiency losses during operation of an associated turbine engine due to weld seams at the leading edges of the blades or other design deviations.

SUMMARY OF THE INVENTION

It is an object of the present invention to provide a more rapid, simpler and cost-effective way to manufacture a blade for outlet guide vanes of this kind. It is also an object of the present invention to provide a more rapid, simpler and more cost-effective method for manufacturing a blade. Further objects of the present invention provide for a blade that is able to be manufactured more rapidly, more simply and more cost-effectively; a corresponding outlet guide vane having at least one such blade, as well as a turbine engine having such an outlet guide vane.

The objectives are achieved in accordance with the present invention by an extruded profile, as well as by a method for manufacturing a blade of an outlet guide vane, by a blade, by an outlet guide vane, as well as by a turbine engine. Advantageous embodiments, including useful refinements of the present invention, are set forth in the respective dependent claims.

The present invention provides an extruded profile for manufacturing a blade of an outlet guide vane of a turbine engine. The extruded profile features a cross-sectional area having an axial length LAX and a thickness D/LAX relative to axial length LAX; the cross-sectional area along axial length LAX thereof having an at least nearly axisymmetric leading edge region, a first transition region having a relative thickness D/LAX that varies along the first transition region, a first constant region, which has a relative thickness D/LAX, is at least substantially constant along the first constant region and which, relative to a leading edge of the extruded profile, begins at the closest at 10% LAX and ends at the furthest at 50% LAX, a second transition region, which has a relative thickness D/LAX that varies along the second transition region, and which, relative to the leading edge of the extruded profile, begins at the closest at 30% LAX and ends at the furthest at 90% LAX, having a second constant region having a relative thickness D/LAX that is at least substantially constant along the second constant region and an axial length X of 40% LAX at most, and having an at least nearly axisymmetric trailing edge region; the mentioned regions adjoining one another. The extruded profile according to the present invention, that may basically be manufactured as an "endless profile," i.e., at any desired length, makes possible a substantially more rapid, simpler and more cost-effective manufacturing of a blade for outlet guide vanes of this kind than would be possible, for example, using sheet-metal blanks to be welded together, since the extruded profile already has the cross sectional blade geometry required for an outlet guide vane. The extruded profile according to the present invention, which may also be referred to as a 2D blank or semifinished product having a profiled shape, may, for example, be formed into a TEC blade having a three-dimensional form design by a simple reshaping and without additional post-machining steps; in spite of short chord lengths, leading edge thicknesses and Reynolds numbers, it being possible for a highly precise and aerodynamically optimal leading edge shape to be implemented. Any geometric deviations resulting from the reshaping process have only very minimal influence on the aerodynamics of the finished blades due to the specific cross-sectional area configuration of the extruded profile according to the present invention. Another advantage of the extruded profile according to the present invention provides that TEC blades and, in particular, what are generally referred to as mini TEC blades generally feature only a slight curvature and axial outflow, so that, first and foremost, an exact profile shape is required at the leading edge that is already finish-formed in the extruded profile according to the present invention. It may also be provided that the extruded profile be additionally cut back at the trailing edge thereof, readily allowing blades having different radial and/or axial extents to be produced from the same extruded profile. Thus, the extruded profile according to the present invention also permits an especially variable and inexpensive manufacturing of precisely shaped blades for outlet guide vanes, thereby making possible an especially reliable and efficient operation of an associated turbine engine. For example, the efficiency of a low-pressure turbine equipped with such an outlet guide vane improves by at least 0.1%, while manufacturing costs are simultaneously reduced.

One advantageous embodiment of the present invention provides that the leading edge region and/or the trailing edge region be configured to be at least substantially circular segment shaped with a circular segment diameter of between 1% and 5% LAX, in particular of between 2% and 4% LAX.

In other words, it is provided that the leading edge region and/or the trailing edge region be configured to be at least approximately circular segment shaped, the diameter of the circular segment being 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9% or 5.0%, for example, of the axial length of the extruded profile. This ensures a flow-optimized and highly precise leading, respectively trailing edge geometry of the blades to be subsequently produced. The circular segment is preferably at least approximately semicircular, respectively has a central angle of approximately 180°; in principle, deviating central angles of greater than or less than 180° also being able to be provided.

Another advantageous embodiment of the present invention provides that the first constant region have a relative thickness D/LAX of between 3% and 6% LAX, preferably of approximately 4% LAX, and/or that, relative to the leading edge of the extruded profile, the first constant region extend within the range of approximately 20% to approximately 40% LAX. In other words, it is provided that the first constant region have a thickness D/LAX that is 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9% or 6.0% of axial length LAX of the extruded profile. It is alternatively or additionally provided that, starting from the leading edge of the extruded profile, the first constant region extend within the range of approximately 20% to approximately 40% of axial length LAX of the extruded profile and thus have a length that corresponds to approximately 20% of axial length LAX of the extruded profile. This makes it possible for the extruded profile to be readily used, both for manufacturing blades having a short, as well as a long type of design.

Other advantages are derived when the first transition region has an axial length X of 20% LAX at most, and/or, relative to the leading edge of the extruded profile, the second transition region ends at the furthest at approximately 80% LAX. In other words, it is provided that the first transition region have an axial length X of 20% LAX at most, thus, for example, of 1%, 2%, 3%, 4%, 5%, 6%, 7%, 8%, 9%, 10%, 11%, 12%, 13%, 14%, 15%, 16%, 17%, 18%, 19% or 20% LAX. This makes possible an especially simple manufacturing of a blade having an asymmetric leading edge region. It is alternatively or additionally provided that the second transition region, which is configured between the first and the second constant region, end at the furthest at 80% of length LAX of the extruded profile. Thus, it may be provided as a function of the configuration and length of the first constant region, for example, that the second transition region end at 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79% or 80% of length LAX of the extruded profile, respectively, that the second transition region have an axial length that is between approximately 10% and approximately 50% of axial length LAX of the extruded profile. This permits an especially precise adjustment of the aerodynamic properties of a blade manufactured from the extruded profile.

Further advantages are derived in that the extruded profile has a suction side whose basic shape is at least predominantly plane along axial length LAX. In other words, it is provided that the extruded profile have a side that functions as a suction side for the blade to be subsequently produced; this side of the extruded profile having a planar form over a length that corresponds to at least 51% of entire axial length LAX of the extruded profile. It is self-evident that this side may fundamentally have a greater axial extent, for example, 55%, 60%, 65%, 70%, 75%, 80%, 85%, 90% or 95% LAX or corresponding intermediate values, such as 55%, 56%, 57%, 58%, 59%, 60% LAX, etc., for example. This makes it possible, through simple reshaping, to manufacture a blade having an aerodynamically very favorably formed suction side, from the extruded profile.

Another advantageous embodiment of the present invention provides that the extruded profile have a pressure side whose basic form is curved in an approximate S-shape, at least in the area of the second transition region. In other words, the extruded profile has a side that is disposed oppositely to the suction side and that functions as a pressure side for the blade to be subsequently produced; in the second transition region, this pressure side, which has a variable cross-sectional thickness in the axial direction, having an approximately S-shaped contour profile. In a structurally simple manner, this ensures that, through simple reshaping of the extruded profile, a blade may be manufactured having an aerodynamically very favorably formed pressure side.

Another advantageous embodiment of the present invention provides that the extruded profile be produced from metal and/or a metal alloy, in particular, be made of a high-temperature resistant metal alloy and/or be produced by extrusion. This makes it possible for the extruded profile to be readily adapted to the operating conditions of the blades to be subsequently produced. Special advantages of the extrusion reside in the possibility of manufacturing profiles having complex cross sectional geometries from materials that are difficult to reshape. In addition, a high degree of deformation accompanied by simultaneously low tool costs is achieved in one single method step.

A second aspect of the present invention relates to a method for manufacturing a blade of an outlet guide vane of a turbine engine where an extruded profile is prepared in accordance with the first inventive aspect, and the blades are produced from the extruded profile using at least one manufacturing method from the group that includes reshaping and separating processes. In other words, a blade for an outlet guide vane is produced from an extruded profile by reshaping and/or separating processes in accordance with the first inventive aspect; for its part, the extruded profile being producible by extrusion, for example. The manufacturing method is selected first and foremost as a function of the desired three-dimensional shape of the blade to be manufactured. Thus, in a simplest embodiment, the extruded profile may be merely reshaped or separated. Alternatively, the extruded profile may be both reshaped as well as separated, the sequence of the individual method steps being fundamentally freely selectable. In principle, it may also be provided that the extruded profile be repeatedly reshaped and/or separated in order to manufacture the blades. Thus, the method according to the present invention makes possible a substantially more rapid, simpler and more cost-effective manufacturing of a blade for outlet guide vanes than would be possible, for example, with the aid of sheet-metal blanks to be welded together, since the extruded profile already has the cross sectional blade geometry required for an outlet guide vane, and merely needs to be slightly curved or arched and/or separated in order to form the finished blades. Other features and advantages thereof will become apparent from the descriptions of the first inventive aspect; advantageous embodiments of the first inventive aspect being considered to be advantageous embodiments of the second inventive aspect and vice versa.

In accordance with another advantageous embodiment of the present invention, at least the steps of reshaping the extruded profile, at least in the leading edge region, and of separating the extruded profile, at least in one region downstream of the first transition region, are implemented to manufacture the blades. This allows the blades to be readily manufactured, both with a desired three-dimensional contour, as well as with a desired radial, respectively axial length. The region downstream of the first transition region may be the first constant region, the second transition region, the second constant region, the trailing edge region, or any desired combination of these regions. A machining process using a geometrically defined cutting edge, or an ablation process, such as laser or electronic cutting may be provided as a separating process, for example; the method according to the present invention not being limited to a specific separating process.

Further advantages are derived when the extruded profile is separated in the second constant region and/or along a sectional plane disposed orthogonally to the cross-sectional area, and/or along a sectional plane disposed in parallel to the cross-sectional area, and/or along a rear sectional plane disposed at an angle to the cross-sectional area. This makes it possible to selectively cut back the extruded profile, respectively the blades manufactured therefrom.

A third aspect of the present invention relates to a blade of an outlet guide vane of a turbine engine; the blade being obtainable and/or obtained from an extruded profile in accordance with the first inventive aspect and/or by a method in accordance with the second inventive aspect. This allows a more rapid, simpler and more cost-effective production of the blades than would be possible, for example, with the aid of sheet-metal blanks to be welded together. The features derived herefrom and the advantages thereof are to be inferred from the descriptions of the first and second inventive aspect, whereby advantageous embodiments of the first and of the second inventive aspect are to be considered as advantageous embodiments of the third inventive aspect and vice versa.

A fourth aspect of the present invention relates to an outlet guide vane for a turbine engine; in accordance with the present invention, this outlet guide vane having at least one blade in accordance with the third inventive aspect. This allows a more rapid, simpler and more cost-effective production of the outlet guide vane than would be possible, for example, with the aid of conventional blades made of welded together sheet-metal blanks. Further advantages resulting herefrom and features thereof will become apparent from the descriptions of the third inventive aspect, whereby advantageous embodiments of the third inventive aspect are to be considered to be advantageous embodiments of the fourth inventive aspect and vice versa.

One advantageous embodiment of the present invention provides that the outlet guide vane include at least two blades in accordance with the third inventive aspect; the at least two blades having different axial lengths. This allows the longer blades to additionally assume structural tasks, thereby advantageously enhancing the load-bearing capacity of the outlet guide vane.

A fifth aspect of the present invention relates to a turbine engine, in particular an aircraft engine, having at least one outlet guide vane that is designed in accordance with the fourth inventive aspect. This makes it possible, on the one hand, to lower the costs for producing the turbine engine and, on the other hand, to increase the efficiency of the turbine engine by at least 0.1%. Further advantages resulting herefrom and features thereof will become apparent from the descriptions of the fourth inventive aspect; whereby advantageous embodiments of the fourth inventive aspect are to be considered as advantageous embodiments of the fifth inventive aspect and vice versa.

One advantageous embodiment of the present invention provides that the outlet guide vane be configured in the region of a turbine outlet of the turbine engine. This makes possible an especially substantial increase in efficiency in that vorticity is removed from the outflow during operation of the turbine engine, thereby improving propulsive efficiency.

BRIEF DESCRIPTION OF THE DRAWINGS

Other features of the present invention are derived from an exemplary embodiment, as shown for example in the drawing. The aforementioned features and feature combinations mentioned in the Specification, as well as the features and combinations of features mentioned in the exemplary embodiments in the following may be used not only in the particular stated combination, but also in other combinations, without departing from the scope of the present invention. Specifically.

DETAILED DESCRIPTION

Figure 1:
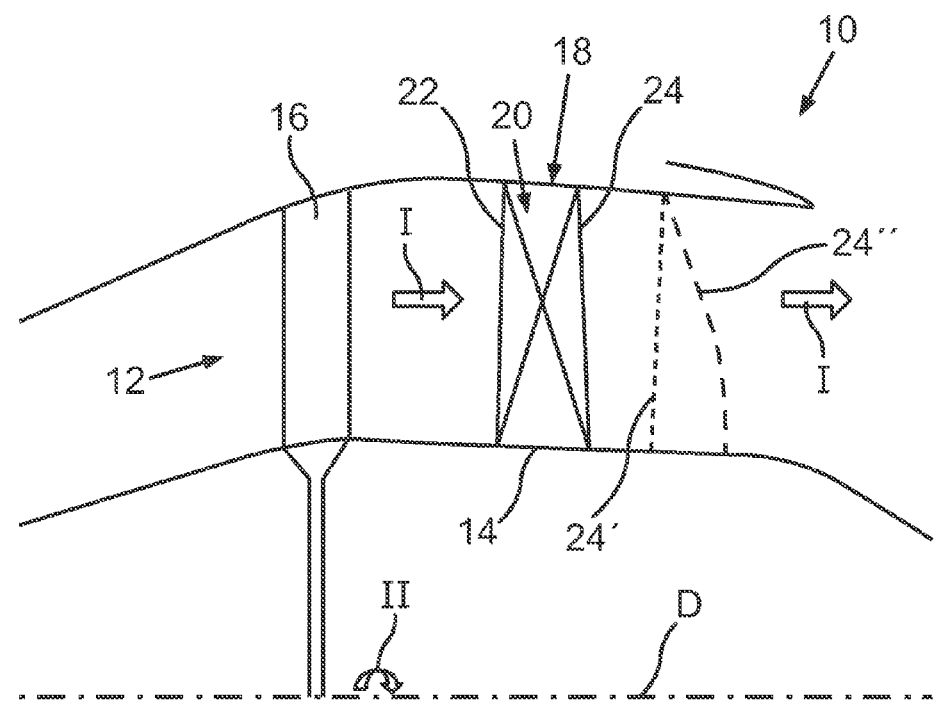
FIG. 1 shows a schematic representation of a turbine outlet region of an aircraft engine.

FIG. 1 shows a schematic representation of an aircraft engine 10 in the region of a turbine outlet 12. Discernible is an annular space 14 that is configured downstream of a last rotor 16 of a low-pressure turbine of aircraft engine 10; rotor 16 rotating in accordance with arrow II about an axis of rotation D. The direction of flow of the operating fluid is characterized by arrows I. An outlet guide vane 18 according to the present invention, also denoted as TEC, is configured in annular space 14. Outlet guide vane 18 includes a plurality of blades 20 that are annularly configured in annular space 14 that, viewed in flow direction I, each feature a leading edge 22 and a trailing edge 24. Depending on the design, one or a plurality of blades 20 may have different axial extents. Trailing edge 24 corresponds to a modern design having comparatively short blades 20, while trailing edge 24' corresponds to a modern design having longer blades 20, and trailing edge 24" corresponds to an older design having long blades 20.

Figure 2:
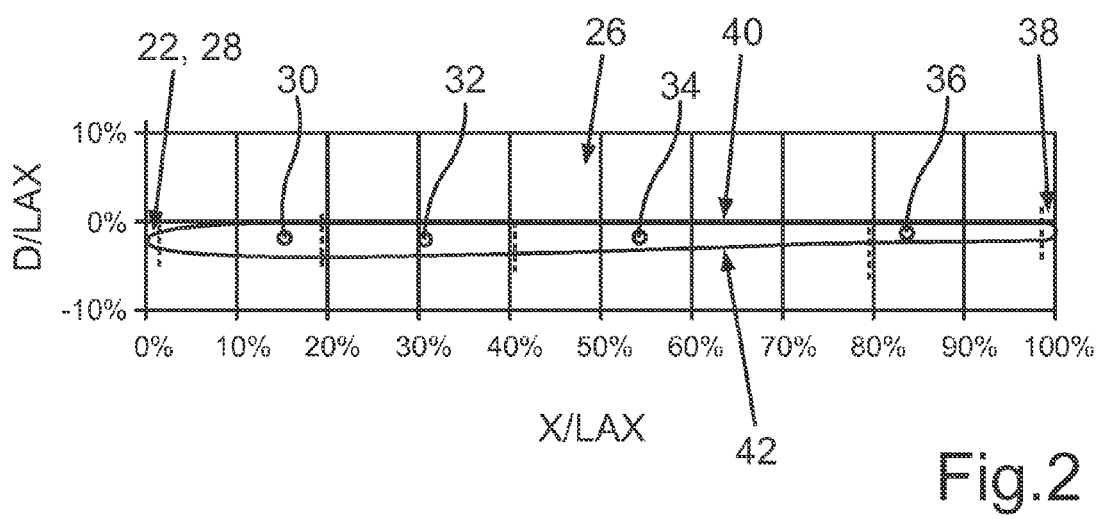
FIG. 2 shows a cross section through an extruded profile according to the present invention.

All of these blades 20 may be manufactured very rapidly, simply and cost-effectively using an extruded profile 26 according to the present invention. For the sake of clarification, FIG. 2 shows a cross section through an exemplary embodiment of a plane extruded profile 26 in accordance with the present invention. It is discernible that extruded profile 26 features a cross-sectional area specifically configured by extrusion having an axial length LAX and a thickness D that varies along the cross-sectional area; relative to axial length LAX, thickness D being indicated as relative thickness D/LAX. Along axial length LAX thereof, cross-sectional area of extruded profile 26 features a plurality of mutually adjoining regions. Extruded profile 26 initially includes an at least nearly axisymmetric leading edge region 28, which, in cross section, corresponds approximately to a semicircular segment having a diameter of 2 to 4% LAX and, accordingly, features an axial extent of approximately 1% to 4% LAX that is dependent thereon.

Contiguous to leading edge region 28, which forms leading edge 22 of finished blade 20, is a first transition region 30 having a relative thickness D that varies along first transition region 30 and an axial length X of 20% LAX at most. Contiguous to first transition region 30 is a first constant region 32 that has a relative thickness D which is at least substantially constant along first constant region 32 and is between approximately 3% and 6% LAX in the illustrated exemplary embodiment. Relative to leading edge 22 of extruded profile 26, it is discernible that first constant region 32 extends within the range of approximately 20% to 40% LAX and, accordingly, has a length of 20% LAX. Contiguous to first constant region 32 is a second transition region 34 having a relative thickness D/LAX that varies along second transition region 34. In the illustrated exemplary embodiment, second transition region 34 begins at approximately 40% LAX and ends at approximately 80% LAX, so that second transition region 34 has a length of approximately 40% LAX. Contiguous to second transition region 34 is a second constant region 36 that has a relative thickness D/LAX which is at least substantially constant along second constant region 36 and has an axial length X of approximately 17% LAX, respectively ends at approximately 97% LAX. Contiguous to second constant region 36 is a trailing edge region 38 which, analogously to leading edge region 28, is configured in cross section to be at least approximately semicircular having a diameter between approximately 2% and 4% LAX. Depending on the specific embodiment and type of further processing of extruded profile 26, trailing edge region 38 may form trailing edge 24" (older design), trailing edge 24' (modern design, long blade) or trailing edge 24 (more modern design, short blade) of a blade 20, for example.

As is also discernible in FIG. 2, extruded profile 26 has an at least substantially plane suction side 40, which extends from approximately 10% LAX to 99% LAX and, in the case of finished blade 20, forms the suction side. Excluded, in particular, from the basic plane shape of suction side 40 extending along the zero line are leading edge region 28 and a portion of first transition region 30 reaching to approximately 10% LAX; since they are formally reduced relative thereto and, together, form an axisymmetric leading region of extruded profile 26. Opposite basic suction side shape 40, extruded profile 26 also has a pressure side 42. In contrast to basic suction side shape 40, it is discernible that pressure side 42 has a varying contour profile in cross section and, in the area of second transition region 34, has an approximately S-shaped curve, respectively, includes an inflection point and formally changes from a right to a left curve.

Figure 3:
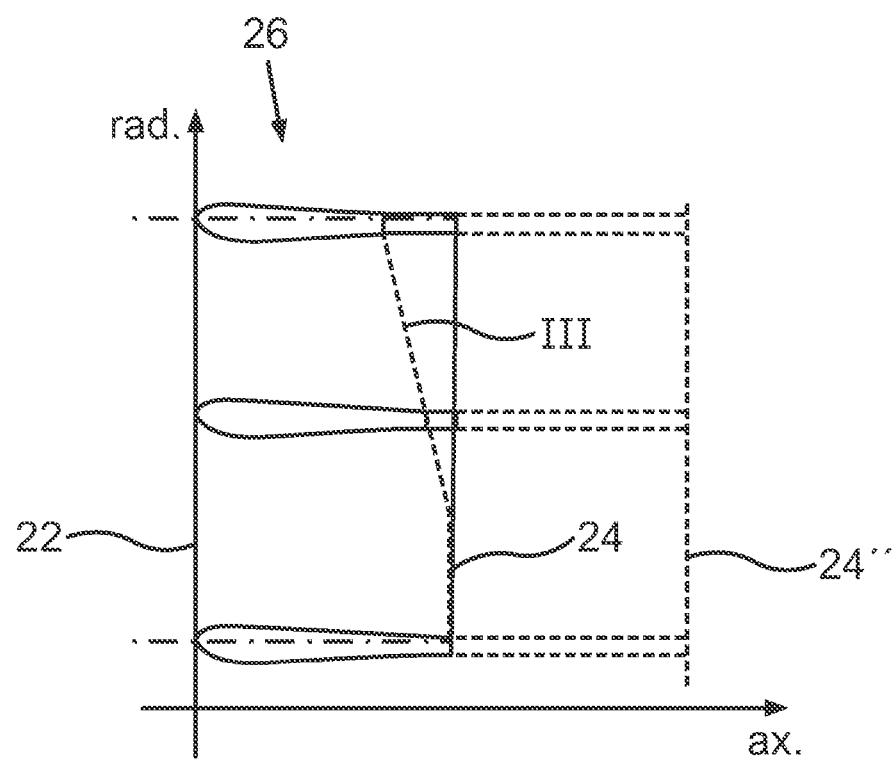
FIG. 3 shows a schematic perspective view of the extruded profile that is reshaped and separated to form a blade.
Figure 4:
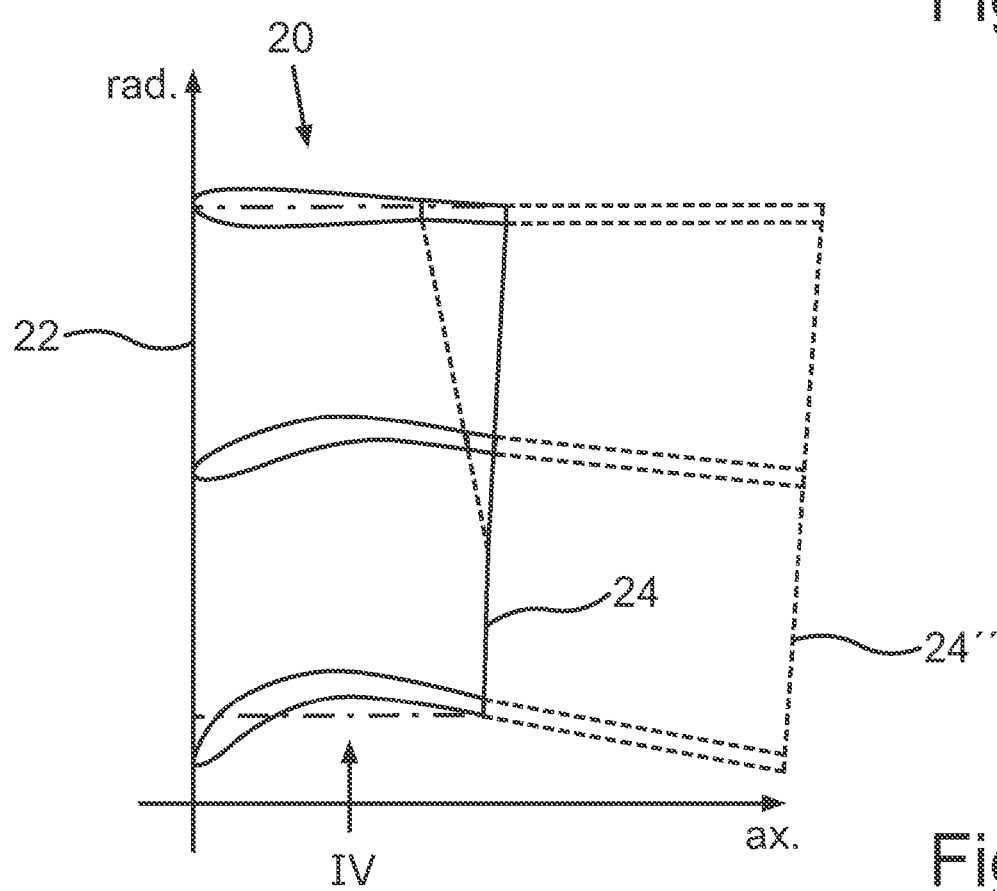
FIG. 4 shows a schematic perspective view of the blade produced from the extruded profile.

FIG. 3 shows a schematic perspective view of extruded profile 26 shown in FIG. 2, from which a blade 20 for an outlet guide vane 18 is produced by reshaping and separating processes; the profile cross sections being shown as turned into the meridian plane (rad; ex). FIG. 3 is clarified in the following in connection with FIG. 4, which shows a schematic perspective view of blade 20 produced from extruded profile 26. Since extruded profile 26 may fundamentally be formed as an "endless" band, extruded profile 26 may initially be trimmed to size in the radial direction (rad.), depending on the desired height. It is self-evident that this step may be eliminated if extruded profile 26 already has the desired height. Extruded profile 26 may subsequently be curved, respectively twisted and/or arched over as a function of the design desired for blade 20, thereby resulting in curvature W of blade 20 having radially variable circular arcs, as is discernible in FIG. 4. Even if blade 20 has small dimensions, a highly accurate leading edge geometry is hereby achieved at a low production cost.

If a blade 20 having a radially variable axial extent is desired, extruded profile 26, respectively blade 20 may be cut back accordingly, thereby making it readily possible to realize blades 20 having designs of different lengths and trailing edges 24, 24" that vary accordingly, etc., from extruded profile 26. Such a rear cut may be accomplished, for example, along sectional plane III illustrated in FIG. 3. For reasons relating to strength, it may be useful to combine shorter blades 20 with a few long blades 20 to produce an outlet guide vane 18. To this end, depending on the desired length, either the same extruded profile 26 or an extruded profile 26 having an alternative cross-sectional area may be used, where, for example, second constant region 36 is simply lengthened accordingly, respectively assumes a larger proportion X/LAX of total length LAX of extruded profile 26. This longer extruded profile 26 may then be preferably deformed in the same manner as in the case of the short blade shape, so that it is precisely sheet-metal ends that remain which may then additionally assume structural tasks in outlet guide vane 18. It may additionally be provided that extruded profile 26, respectively blade 20 be separated along a rear sectional plane disposed at an angle to the cross-sectional area in order to obtain a blade 20 having a suitable profiled shape. Blade 20 may then be used in a manner known per se for producing outlet guide vane 18. Thus, while entailing minimal manufacturing costs, a reliable and efficient operation of aircraft engine 10 is possible. This manufacturing method is facilitated by the fact that TEC blades 20 usually feature only a slight curvature IV and axial outflow, so that an exact profile shape is required, in particular at leading edge 22.

The values indicated in the documents for characterizing specific properties of the subject matter of the present invention are also considered as included within the scope of the present invention, even in the context of deviations—due, for example, to measurement errors, system errors, weighing errors, DIN tolerances and the like. In particular, deviations of ±10% of the value in question are considered as incorporated herein.

What is claimed is:

1. An extruded profile for manufacturing a blade of an outlet guide vane of a turbine engine, the extruded profile comprising:
    a cross-sectional area having an axial length LAX and a thickness D/LAX relative to axial length LAX, along axial length LAX thereof, the cross-sectional area having the following mutually adjoining regions:
    an at least nearly axisymmetric leading edge region;
    a first transition region having a relative thickness D/LAX varying along the first transition region;
    a first constant region having a relative thickness D/LAX at least substantially constant along the first constant region, the first constant region, relative to a leading edge of the extruded profile, beginning at the closest at 10% LAX and ends at the furthest at 50% LAX;
    a second transition region having a relative thickness D/LAX varying along the second transition region, the second transition region, relative to the leading edge, beginning at the closest at 30% LAX and ending at the furthest at 90% LAX;
    a second constant region having a relative thickness D/LAX at least substantially constant along the second constant region, the second constant region having an axial length X of 40% LAX at most; and an at least nearly axisymmetric trailing edge region, wherein the first constant region has a relative thickness D/LAX of between 3% and 6% LAX or, relative to the leading edge of the extruded profile, the first constant region extends within the range of approximately 20% to 40% LAX, and wherein the first constant region relative thickness D/LAX is approximately 4% LAX.

2. The extruded profile as recited in claim 1 wherein the leading edge region or the trailing edge region is configured to be at least substantially circular segment shaped with a circular segment diameter of between 1% and 5% LAX.

3. The extruded profile as recited in claim 2 wherein the leading edge region or the trailing edge region is configured to be at least substantially circular segment shaped with a circular segment diameter of between 2% and 4% LAX.

4. The extruded profile as recited in claim 1 wherein the first transition region has an axial length X of 20% LAX at most or, relative to the leading edge of the extruded profile, the second transition region ends at the furthest at approximately 80% LAX.

5. The extruded profile as recited in claim 1 wherein the profile is metal or a metal alloy or is produced by extrusion.

6. The extruded profile as recited in claim 5 wherein the profile is made of a high-temperature resistant metal alloy.

7. A blade of an outlet guide vane of a turbine engine obtainable or obtained from the extruded profile as recited in claim 1.

8. An outlet guide vane for a turbine engine comprising at least one blade as recited in claim 7.

9. A turbine engine comprising at least one outlet guide vane as recited in claim 8.

10. An aircraft engine comprising the turbine engine as recited in claim 9.

11. The turbine engine as recited in claim 9 wherein the outlet guide vane is configured in the area of a turbine outlet of the turbine engine.

12. The outlet guide vane for a turbine engine comprising at least two blades as recited in claim 7, the at least two blades having different axial lengths LAX.

13. An extruded profile for manufacturing a blade of an outlet guide vane of a turbine engine, the extruded profile comprising:
a cross-sectional area having an axial length LAX and a thickness D/LAX relative to axial length LAX, along axial length LAX thereof, the cross-sectional area having the following mutually adjoining regions:
an at least nearly axisymmetric leading edge region;
a first transition region having a relative thickness D/LAX varying along the first transition region;
a first constant region having a relative thickness D/LAX at least substantially constant along the first constant region, the first constant region, relative to a leading edge of the extruded profile, beginning at the closest at 10% LAX and ends at the furthest at 50% LAX;
a second transition region having a relative thickness D/LAX varying along the second transition region, the second transition region, relative to the leading edge, beginning at the closest at 30% LAX and ending at the furthest at 90% LAX;
a second constant region having a relative thickness D/LAX at least substantially constant along the second constant region, the second constant region having an axial length X of 40% LAX at most; and
an at least nearly axisymmetric trailing edge region, and wherein the extruded profile further comprises a suction side having a basic shape that is at least predominantly plane along the axial length LAX.

14. The extruded profile as recited in claim 13 wherein the leading edge region or the trailing edge region is configured to be at least substantially circular segment shaped with a circular segment diameter of between 1% and 5% LAX.

15. The extruded profile as recited in claim 13 wherein the leading edge region or the trailing edge region is configured to be at least substantially circular segment shaped with a circular segment diameter of between 2% and 4% LAX.

16. The extruded profile as recited in claim 13 wherein the first transition region has an axial length X of 20% LAX at most or, relative to the leading edge of the extruded profile, the second transition region ends at the furthest at approximately 80% LAX.

17. An extruded profile for manufacturing a blade of an outlet guide vane of a turbine engine, the extruded profile comprising:
a cross-sectional area having an axial length LAX and a thickness D/LAX relative to axial length LAX, along axial length LAX thereof, the cross-sectional area having the following mutually adjoining regions:
an at least nearly axisymmetric leading edge region;
a first transition region having a relative thickness D/LAX varying along the first transition region;
a first constant region having a relative thickness D/LAX at least substantially constant along the first constant region, the first constant region, relative to a leading edge of the extruded profile, beginning at the closest at 10% LAX and ends at the furthest at 50% LAX;
a second transition region having a relative thickness D/LAX varying along the second transition region, the second transition region, relative to the leading edge, beginning at the closest at 30% LAX and ending at the furthest at 90% LAX;
a second constant region having a relative thickness D/LAX at least substantially constant along the second constant region, the second constant region having an axial length X of 40% LAX at most; and
an at least nearly axisymmetric trailing edge region, and wherein the extruded profile further comprises a pressure side having a basic form curved in an approximate S-shape, at least in the area of the second transition region.

18. The extruded profile as recited in claim 17 wherein the leading edge region or the trailing edge region is configured to be at least substantially circular segment shaped with a circular segment diameter of between 1% and 5% LAX.

19. The extruded profile as recited in claim 17 wherein the leading edge region or the trailing edge region is configured to be at least substantially circular segment shaped with a circular segment diameter of between 2% and 4% LAX.

20. The extruded profile as recited in claim 17 wherein the first transition region has an axial length X of 20% LAX at most or, relative to the leading edge of the extruded profile, the second transition region ends at the furthest at approximately 80% LAX.

21. A method for manufacturing a blade of an outlet guide vane of a turbine engine comprising:
preparing an extruded profile including a cross-sectional area having an axial length LAX and a thickness D/LAX relative to axial length LAX, along axial length LAX thereof, the cross-sectional area having the following mutually adjoining regions:

an at least nearly axisymmetric leading edge region,
a first transition region having a relative thickness D/LAX varying along the first transition region;
a first constant region having a relative thickness D/LAX at least substantially constant along the first constant region, the first constant region, relative to a leading edge of the extruded profile, beginning at the closest at 10% LAX and ends at the furthest at 50% LAX,
a second transition region having a relative thickness D/LAX varying along the second transition region, the second transition region, relative to the leading edge, beginning at the closest at 30% LAX and ending at the furthest at 90% LAX;
a second constant region having a relative thickness D/LAX at least substantially constant along the second constant region, the second constant region having an axial length X of 40% LAX at most, and an at least nearly axisymmetric trailing edge region; and
producing blades from the extruded profile using a manufacturing method including reshaping and separating processes;
wherein the reshaping includes reshaping the extruded profile at least in the leading edge region and the separating includes separating the extruded profile, at least in one region downstream of the first transition region.

22. The method as recited in claim 21 wherein the extruded profile is separated in the second constant region or along a sectional plane disposed orthogonally to the cross-sectional area, or along a sectional plane disposed in parallel to the cross-sectional area, or along a rear sectional plane disposed at an angle to the cross-sectional area.

23. A blade of an outlet guide vane of a turbine engine obtainable or obtained from the method as recited in claim 21.

* * * * *